US010518980B2

United States Patent
Gerdeman et al.

(10) Patent No.: US 10,518,980 B2
(45) Date of Patent: Dec. 31, 2019

(54) AUGER COUPLING ASSEMBLY WITH A PIVOTABLE CLUTCH

(71) Applicant: Unverferth Manufacturing Company, Inc., Kalida, OH (US)

(72) Inventors: Shawn Gerdeman, Delphos, OH (US); Ryan Fleshner, Allison, IA (US)

(73) Assignee: Unverferth Manufacturing Company, Inc., Kalida, OH (US)

( * ) Notice: Subject to any disclaimer, the term of this patent is extended or adjusted under 35 U.S.C. 154(b) by 74 days.

(21) Appl. No.: 15/971,921

(22) Filed: May 4, 2018

(65) Prior Publication Data

US 2019/0337725 A1 Nov. 7, 2019

(51) Int. Cl.
  *B65G 33/32* (2006.01)
  *B65G 33/14* (2006.01)
  *A01D 90/10* (2006.01)

(52) U.S. Cl.
  CPC ............. *B65G 33/32* (2013.01); *A01D 90/10* (2013.01); *B65G 33/14* (2013.01); *B65G 2201/04* (2013.01); *B65G 2207/08* (2013.01); *B65G 2812/0577* (2013.01)

(58) Field of Classification Search
  CPC ................................ B65G 33/32; A01D 90/10
  See application file for complete search history.

(56) References Cited

U.S. PATENT DOCUMENTS

| | | | | |
|---|---|---|---|---|
| 2,138,576 A | * | 11/1938 | Gebert | B65G 33/32 |
| | | | | 198/666 |
| 3,337,068 A | * | 8/1967 | Meharry | A01C 15/003 |
| | | | | 414/523 |
| 3,550,793 A | * | 12/1970 | Garner | A01D 41/1217 |
| | | | | 414/523 |
| 3,701,385 A | | 10/1972 | Patterson et al. | |
| 4,295,552 A | | 10/1981 | Erlach | |
| 4,307,291 A | | 12/1981 | Gloviak et al. | |
| 4,437,553 A | | 3/1984 | Geisthoff | |
| 4,621,968 A | | 11/1986 | Hutchison | |
| 4,848,547 A | | 7/1989 | Kämpf | |
| 4,989,716 A | * | 2/1991 | Stuckey | B65G 33/32 |
| | | | | 198/311 |

(Continued)

FOREIGN PATENT DOCUMENTS

GB 536632 5/1941

*Primary Examiner* — Jonathan Snelting
(74) *Attorney, Agent, or Firm* — Rothwell, Figg, Ernst & Manbeck, P.C.

(57) ABSTRACT

An auger assembly for a farm implement, in which the auger assembly includes a first auger section having a first auger shaft that rotates in a conveying direction about a longitudinal axis of the first auger section and a second auger section having a second auger shaft that rotates about a longitudinal axis of the second auger section. The auger assembly includes a first auger coupling portion that includes a drive hub and a lobe. The auger assembly includes a second auger coupling portion that includes a sleeve, which receives the drive hub such that the drive hub is rotatably engaged with the sleeve. The auger assembly includes a drive pin secured to the second auger coupling portion and a latch arm that pivots in a direction substantially parallel to the longitudinal axis of the second auger section between an engaged position and a disengaged position.

13 Claims, 18 Drawing Sheets

(56) References Cited

U.S. PATENT DOCUMENTS

| | | | |
|---|---|---|---|
| 6,422,376 B1* | 7/2002 | Nichols | B65G 33/32 |
| | | | 198/632 |
| 7,100,756 B2 | 9/2006 | Kimes et al. | |
| 7,329,189 B2 | 2/2008 | Van Mill et al. | |
| 7,367,881 B2* | 5/2008 | Voss | A01D 41/1217 |
| | | | 414/526 |
| 8,033,377 B2 | 10/2011 | Reimer et al. | |
| 8,827,782 B2* | 9/2014 | Dise | A01F 12/46 |
| | | | 460/114 |
| 9,039,340 B2 | 5/2015 | Van Mill et al. | |
| 9,102,478 B2 | 8/2015 | Van Mill et al. | |
| 9,216,681 B1 | 12/2015 | Van Mill et al. | |
| 9,272,653 B2 | 3/2016 | Van Mill et al. | |
| 9,706,713 B2 | 7/2017 | Van Mill et al. | |
| 9,723,783 B2 | 8/2017 | Patterson et al. | |
| 9,723,789 B2 | 8/2017 | Van Mill et al. | |
| 9,827,782 B2 | 11/2017 | Nishi | |
| 9,848,536 B2 | 12/2017 | Van Mill et al. | |
| 10,399,787 B2* | 9/2019 | Rodrigues | B65G 33/32 |
| 2006/0150444 A1 | 7/2006 | Friberg et al. | |
| 2017/0055454 A1* | 3/2017 | Michael | B60P 1/42 |
| 2017/0354091 A1 | 12/2017 | Van Mill et al. | |

* cited by examiner

AUGER COUPLING ASSEMBLY WITH A PIVOTABLE CLUTCH

FIELD OF THE DISCLOSURE

This disclosure relates generally to farm implements, and more particular, to grain carts have folding auger assemblies.

BACKGROUND

In agriculture, augers are frequently used to move an agricultural material from a cart to another cart, silo, truck, or other storage facility. A typical auger for a grain cart includes an auger screw that is housed inside a tubular housing. An intake portion of the auger assembly can draw from a hopper (usually by gravity) attached to it to receive grain or other material from the hopper and the other end (i.e., the discharge end) has a chute or the like to guide the grain or other material into its destination.

As a grain cart with a fully extended auger can be somewhat unwieldy during transport, many grain carts employ folding augers that can open to an operating position and fold to a transport position. In general, a folding auger assembly includes a lower auger segment and an upper auger segment, in which the upper auger segment moves with respect to the lower auger segment between the operating position and the transport position. Accordingly, folding augers typically include a joint assembly disposed at a junction between the upper and lower auger segments and received in the tubular housing, whereby the joint assembly allows one end of the lower auger screw to releasably connect to one end of the upper auger screw when the auger assembly is in the unloading position. Furthermore, the joint assembly typically includes a drive member coupled to the lower auger screw and a driven member coupled to the upper auger screw, in which the drive member rotatably couples to the driven member to transmit torque from the lower auger screw to the upper auger screw.

SUMMARY

In some instances, however, the upper auger screw rotates at a significantly faster rate than the lower auger screw, whereby the drive and driven members separate substantially from each other. One cause for this speed differential between the upper and lower auger screws is that the upper auger screw typically has a higher rotational momentum than the lower auger due to difference in auger lengths between the upper and lower auger segments. Another cause for the speed differential between the upper and lower auger screws is that the lower auger is typically connected to other drivetrain members, such as gearboxes, universal joints and bearings, which provide additional drag that slows the lower auger screw at a higher rate than the upper auger screw.

For example, at the end of the unloading process when the torque applied by an engine to the lower auger screw is cut-off, the drivetrain members connected to the lower auger screw generate a drag force that slows the rotation of the lower auger screw at a higher rate than the rotation of the upper auger screw. The speed differential between the lower and upper auger screws displaces the driven member from the drive member by a substantial degree or distance. Consequently, when torque is re-applied to the lower auger in the next unloading process begins, the drive member travels at a greater distance before re-engaging the driven member such that the drive member engages the drive member with high impact.

The high impact between the drive and driven members wears out the joint assembly. Over time, the excessive wear on the joint assembly results in component failures and improper operating conditions, ultimately reducing the longevity of the auger assembly and the farm implement.

Accordingly, there is a need to provide an improved auger assembly for a farm implement that minimizes the degree of separation between the drive and driven members of the auger coupling assembly when the auger assembly is set in the operating position. In particular, there is a need to provide an improved auger coupling assembly that maintains a lobe of a lower auger coupling portion adjacent to or within a predetermined degree of separation from a drive pin of an upper auger coupling portion when the auger assembly is set in the operating position.

According to a first aspect, embodiments of an auger assembly for a farm implement are provided. The auger assembly may comprise a first auger section comprising a first auger shaft configured to rotate in a conveying direction about a longitudinal axis of the first auger section; a second auger section comprising a second auger shaft configured to rotate about a longitudinal axis of the second auger section; a first auger coupling portion coupled to an end of the first auger shaft, the first auger coupling portion comprising a drive hub and a lobe projecting from a side surface of the drive hub; a second auger coupling portion coupled to an end of the second auger shaft, the second auger coupling portion comprising a sleeve configured to receive the drive hub such that the drive hub is rotatably engaged with the sleeve; a drive pin secured to the second auger coupling portion; and a latch arm configured to pivot in a direction substantially parallel to the longitudinal axis of the second auger section between an engaged position and a disengaged position. The lobe may be configured to rotationally engage the drive pin in the conveying direction such that rotation forces are transmitted from the first auger shaft to the second auger shaft when the drive hub is received in the sleeve. The latch arm may be configured to rotationally engage the lobe in the conveying direction when the latch arm is in the engaged position, such that the latch arm maintains the lobe adjacent the drive pin or within a predetermined degree of separation from the drive pin.

In some embodiments, the lobe may be configured to rotationally engage the latch arm in the conveying direction when the drive hub is received in the sleeve and the lobe is displaced from rotatably engaging the drive pin in the conveying direction, thereby causing the latch arm to pivot toward the disengaged position such that the lobe rotates toward the drive pin in the conveying direction. In some embodiments, the latch arm may be configured to pivot back to the engaged position when the lobe is positioned for rotational engagement with the drive pin, thereby maintaining the lobe adjacent the drive pin or within a predetermined degree of separation from the drive pin.

In some embodiments, the latch arm may be configured to pivot about a pivot axis extending through the sleeve. In some embodiments, the latch arm may comprise a first end pivotably secured to the upper auger coupling portion and a second end configured to move in a direction substantially parallel to the longitudinal axis of the second auger section. In some embodiments, the drive pin may comprise a cam surface projecting beyond an end face of the sleeve, and the lobe is configured to rotatably engage the cam surface of the drive pin in the conveying direction when the drive hub is received in the sleeve. In some embodiments, the drive hub may comprise a shoulder configured to engage an end face of the sleeve when the drive hub is received in the sleeve.

In some embodiments, the latch arm may be biased toward the engaged position. In some embodiments, rotation of the lobe in said direction opposite to the conveying direction is less than about 20 degrees. In some embodiments, rotation of the lobe in said direction opposite to the conveying direction is about 10 degrees.

According to another aspect, embodiments of a farm implement are provided. The farm implement may comprise a frame, a container mounted on said frame and configured to hold agricultural material, and an auger assembly configured to convey agricultural material held in the container. In some embodiments, the auger assembly may comprise a first auger section comprising a first auger shaft configured to rotate in a conveying direction about a longitudinal axis of the first auger section and a first helical flight array disposed along and projected from the first auger shaft. In some embodiments, the auger assembly may comprise a second auger section comprising a second auger shaft configured to rotate about a longitudinal axis of the second auger section and a second helical flight array disposed along and projected from the second auger shaft. In some embodiments, the auger assembly may comprise a folding joint assembly coupled to the first and second auger sections and comprising a folding axis. In some embodiments, the folding joint assembly may be configured to move the second auger section between a transport position and an operating position. In some embodiments, the auger assembly may comprise an auger shaft coupling assembly configured to releasably connect an end of the first auger shaft to an end of the second auger shaft when the second auger section is set in the operating position. In some embodiments, the auger shaft coupling assembly may comprise a first auger coupling portion coupled to the end of the first auger shaft, a second auger coupling portion coupled to the end of the second auger shaft, a drive pin secured to the second auger coupling portion; and a latch arm configured to pivot in a direction substantially parallel to the longitudinal axis of the second auger section between an engaged position and a disengaged position. In some embodiments, the first auger coupling portion may comprise a lobe. In some embodiments, the second auger coupling portion may be configured to at least partially receive the first auger coupling portion. In some embodiments, the lobe may be configured to rotationally engage the drive pin in the conveying direction when the first auger coupling portion is at least partially received in the second auger coupling portion, such that rotation forces are transmitted from the first auger shaft to the second auger shaft. In some embodiments, the latch arm may be configured to rotationally engage the lobe in the conveying direction when the latch arm is in the engaged position, such that the latch arm maintains the lobe adjacent the drive pin or within a predetermined degree of separation from the drive pin.

Other features and characteristics of the subject matter of this disclosure, as well as the methods of operation, functions of related elements of structure and the combination of parts, and economies of manufacture, will become more apparent upon consideration of the following description and the appended claims with reference to the accompanying drawings, all of which form a part of this specification, wherein like reference numerals designate corresponding parts in the various figures.

BRIEF DESCRIPTION OF THE DRAWINGS

The accompanying drawings, which are incorporated herein and form part of the specification, illustrate various embodiments of the subject matter of this disclosure. In the drawings, like reference numbers indicate identical or functionally similar elements.

DETAILED DESCRIPTION

Figure 1:
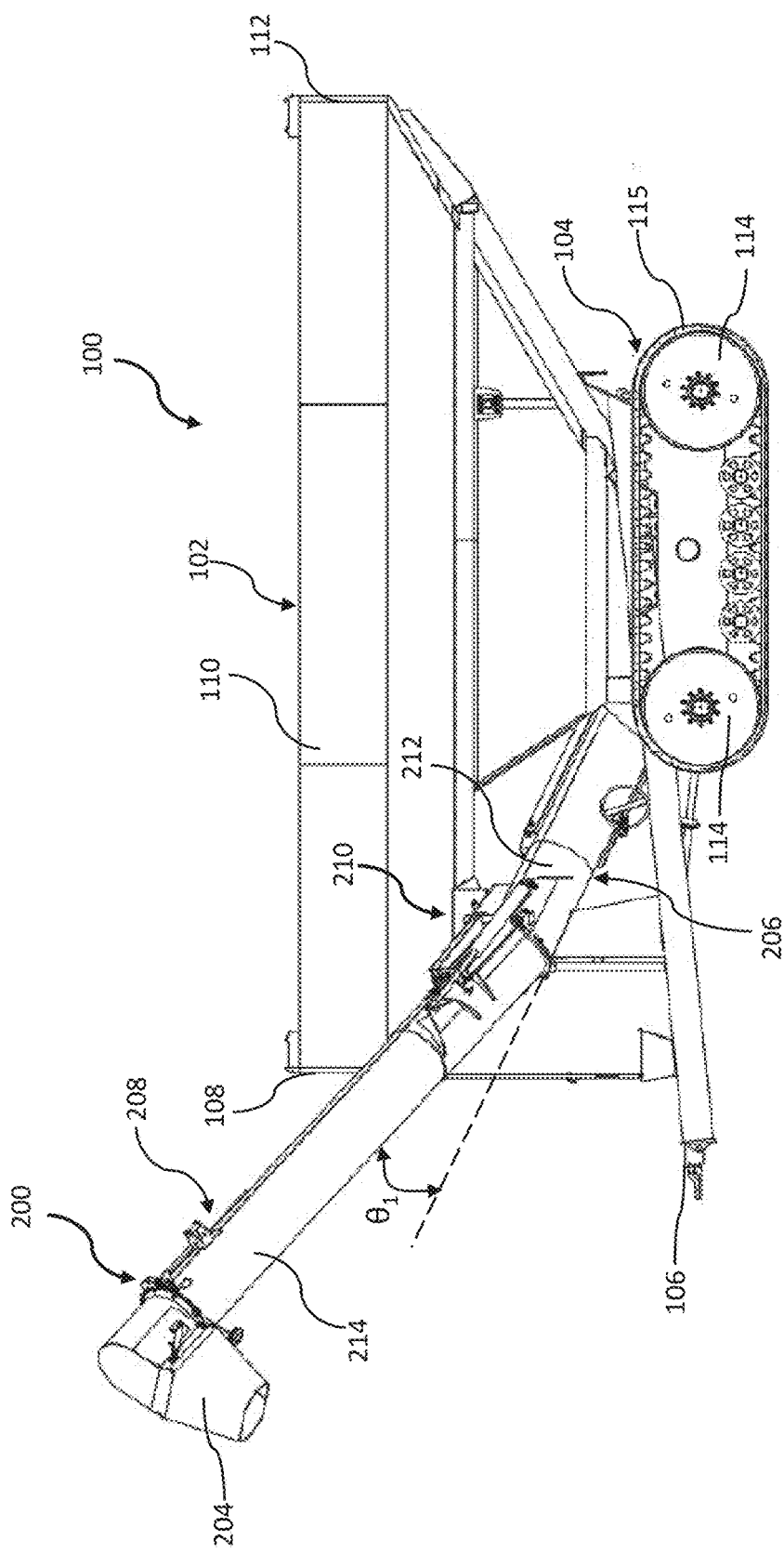
FIG. 1 is a side view of a grain cart having an auger assembly set in the operating position according to an exemplary embodiment.

While aspects of the subject matter of the present disclosure may be embodied in a variety of forms, the following description and accompanying drawings are merely intended to disclose some of these forms as specific examples of the subject matter. Accordingly, the subject matter of this disclosure is not intended to be limited to the forms or embodiments so described and illustrated.

Unless defined otherwise, all terms of art, notations and other technical terms or terminology used herein have the same meaning as is commonly understood by one of ordinary skill in the art to which this disclosure belongs. All patents, applications, published applications and other publications referred to herein are incorporated by reference in their entirety. If a definition set forth in this section is contrary to or otherwise inconsistent with a definition set forth in the patents, applications, published applications, and other publications that are herein incorporated by reference, the definition set forth in this section prevails over the definition that is incorporated herein by reference.

Unless otherwise indicated or the context suggests otherwise, as used herein, "a" or "an" means "at least one" or "one or more."

This description may use relative spatial and/or orientation terms in describing the position and/or orientation of a component, apparatus, location, feature, or a portion thereof. Unless specifically stated, or otherwise dictated by the context of the description, such terms, including, without limitation, top, bottom, above, below, under, on top of, upper, lower, left of, right of, in front of, behind, next to, adjacent, between, horizontal, vertical, diagonal, longitudinal, transverse, radial, axial, etc., are used for convenience in referring to such component, apparatus, location, feature, or a portion thereof in the drawings and are not intended to be limiting.

Furthermore, unless otherwise stated, any specific dimensions mentioned in this description are merely representative of an exemplary implementation of a device embodying aspects of the disclosure and are not intended to be limiting.

The use of the term "about" applies to all numeric values specified herein, whether or not explicitly indicated. This term generally refers to a range of numbers that one of ordinary skill in the art would consider as a reasonable amount of deviation to the recited numeric values (i.e., having the equivalent function or result) in the context of the present disclosure. For example, and not intended to be limiting, this term can be construed as including a deviation of ±10 percent of the given numeric value provided such a deviation does not alter the end function or result of the value. Therefore, under some circumstances as would be appreciated by one of ordinary skill in the art a value of about 1% can be construed to be a range from 0.9% to 1.1%.

As used herein, the term "set" refers to a collection of one or more objects. Thus, for example, a set of objects can include a single object or multiple objects. Objects of a set also can be referred to as members of the set. Objects of a set can be the same or different. In some instances, objects of a set can share one or more common properties.

As used herein, the term "adjacent" refers to being near or adjoining. Adjacent objects can be spaced apart from one another or can be in actual or direct contact with one another. In some instances, adjacent objects can be coupled to one another or can be formed integrally with one another.

As used herein, the terms "substantially" and "substantial" refer to a considerable degree or extent. When used in conjunction with, for example, an event, circumstance, characteristic, or property, the terms can refer to instances in which the event, circumstance, characteristic, or property occurs precisely as well as instances in which the event, circumstance, characteristic, or property occurs to a close approximation, such as accounting for typical tolerance levels or variability of the embodiments described herein.

As used herein, the terms "optional" and "optionally" mean that the subsequently described, component, structure, element, event, circumstance, characteristic, property, etc. may or may not be included or occur and that the description includes instances where the component, structure, element, event, circumstance, characteristic, property, etc. is included or occurs and instances in which it is not or does not.

Figure 2:
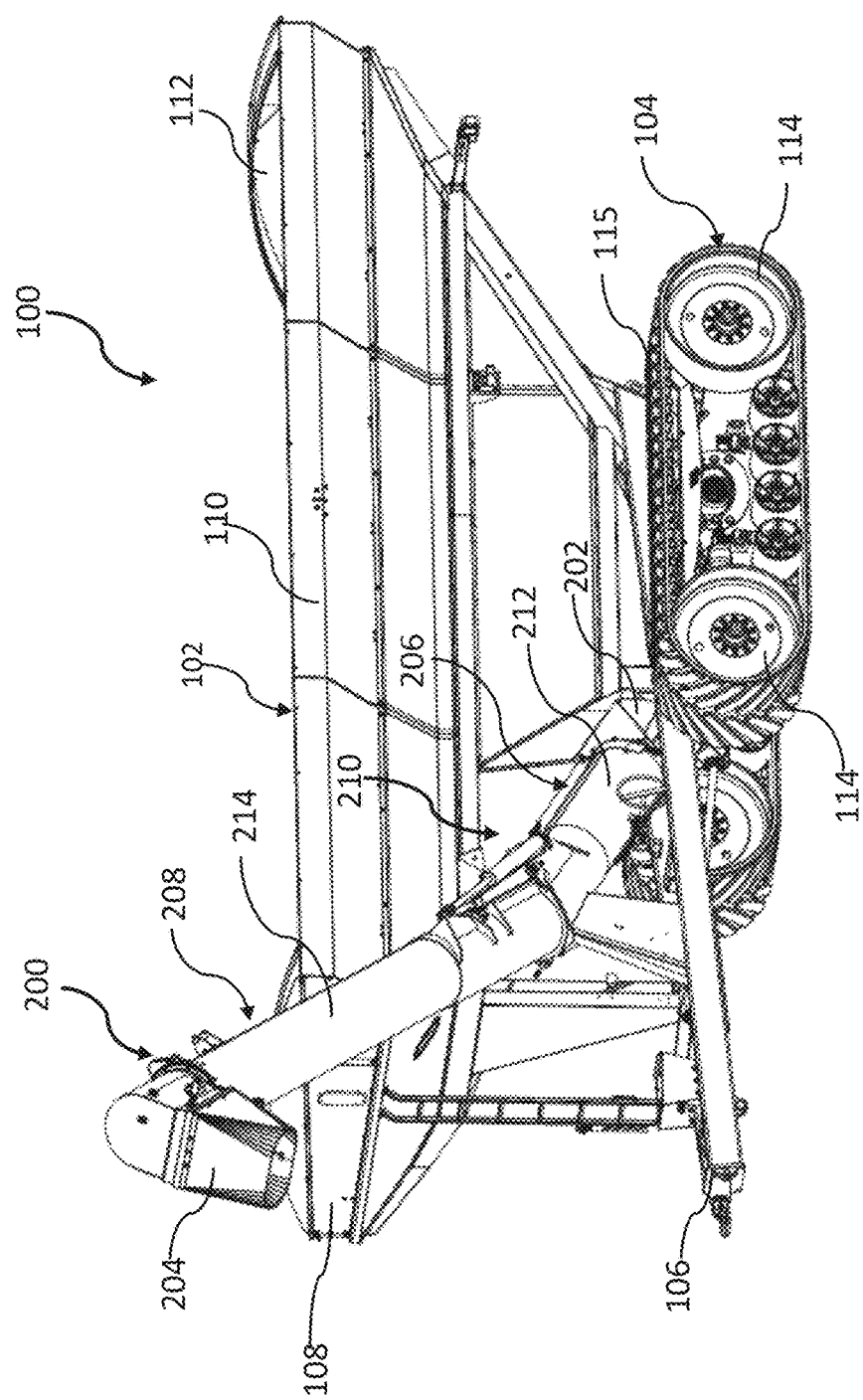
FIG. 2 is a perspective view of a grain cart having an auger assembly set in the operating position according to an exemplary embodiment.

FIGS. 1 and 2 depict a grain cart 100 with a folding auger assembly 200 in an operating position according to one embodiment of the present disclosure. The grain cart 100 includes a grain holding container or hopper 102 mounted on a frame with a track assembly 104 and a hitch 106. In the illustrated embodiment, the track assembly 104 includes front and rear idler wheels 114 and a track belt 115 looped around the front and rear idler wheels 114 to make contact with a ground surface. In other embodiments, the frame may also be mounted to wheels, without a track assembly, for moving the grain cart 100. The hopper 102 has a front wall or side 108, laterally opposed side walls 110, and a rear wall or side 112, which together define a grain holding space with an open top and a bottom. Referring to FIG. 2, an intake or receiving portion 202 of the auger assembly 200 forms a sump proximate the base or bottom of the hopper 102 to draw grain from the bottom of the hopper 102 into the auger assembly 200. In some embodiments, the intake draws grain from the bottom of the hopper into the auger assembly 200 by gravity, while in other embodiments grain is fed into auger assembly 200 by another auger or conveyor. The auger assembly 200 extends upwardly from the intake portion to a discharge portion 204 laterally and forwardly spaced from the hopper 102 to facilitate discharge of grain from the auger assembly 200 into another container such as, for instance, another grain cart, semi-trailer, or rail car located to the side of the grain cart 100.

As shown in FIGS. 1 and 2, the auger assembly 200 includes a lower auger section 206 and an upper auger section 208. The lower auger section 206 extends from intake portion 202 near the bottom of hopper 102 to a front corner of the hopper 102 where the one of the laterally opposed side walls 110 intersects front wall 108. In some embodiments, lower auger section 206 extends from intake portion 202 to a point proximally adjacent to a front corner, immediately adjacent to a front corner, or disposed at or substantially at a front corner of the hopper. The upper auger section 208 is connected to the lower auger assembly section 206 by a folding joint assembly 210 (shown in FIG. 4) that allows the upper auger section 208 to be moved between an operating position extending laterally and forwardly outward from the front corner of the hopper 102 and a transport position folded across the side of the hopper 102. In other embodiments (not shown), the folding joint assembly 210 is configured to connect the upper auger section 208 with the lower auger section 206 such that the upper auger section 208 may be moved between an operating position extending laterally and forwardly outward from the forward corner of the cart and a transport position folded diagonally across the front of the cart, such as one of the auger assemblies described in U.S. Pat. No. 9,039,340, entitled "Grain Cart with Folding Auger"; the entire contents of which are herein incorporated by reference.

In one embodiment, the folding joint assembly 210 is configured such that, in the operating position, the upper auger assembly portion 208 is angularly offset from the lower auger assembly portion 206 to the discharge portion 204 at an elevated position forwardly and to the side of the hopper 102. That is, a longitudinal axis of the upper auger assembly portion 208 may in one embodiment intersect a longitudinal axis of the lower auger assembly portion 206 at an angle $\theta_1$ (see FIG. 1). The discharge portion 204 has a rotatable opening or spout that may be positioned to discharge grain from the auger assembly 200 into a grain trailer or another grain cart located to the side of grain cart 100.

In one embodiment, the folding joint assembly 210 is configured such that, in the transport position, the upper auger section 208 is folded at the folding joint assembly 210 to extend rearwardly along a side of cart 100. In the transport position of this embodiment, the entire auger assembly 200 is disposed substantially within the external dimensional boundaries of the grain cart. In accordance with some embodiments, the upper auger section 208 may fit within the external dimensional boundaries of the grain cart, when in the transport position, or extend past it, e.g., past the rear of cart 100.

According to some embodiments of the present disclosure, the upper auger section 208 is offset from the lower auger section 206 by an operating offset angle $\theta_1$ (shown in FIG. 1). That is to say that a line (i.e., a longitudinal axis)

running through the center of the lower auger section 206 would be offset by an operating offset angle $\theta_1$ from a line (i.e., a longitudinal axis) running through the center of the upper auger section 208. As illustrated in FIG. 1, the offset angle increases side reach of the auger assembly 200 by positioning the upper auger section 208 laterally to the left. In certain embodiments, operating offset angle $\theta_1$ ranges from about greater than 0° to about 20°, or preferably about 15° to 19°. In certain non-limiting embodiments, operating offset angle $\theta_1$ is about 17.5°. In accordance with one non-limiting embodiment, an offset angle of about 17.5° can be utilized to provide desirable side reach and forward reach of the upper auger section 208. In other embodiments, other offset angles may be used as well. While the upper and lower auger sections need not be co-linear, in other embodiments, the upper and lower auger sections are co-linear, and do not form an operating offset angle.

Figure 4:
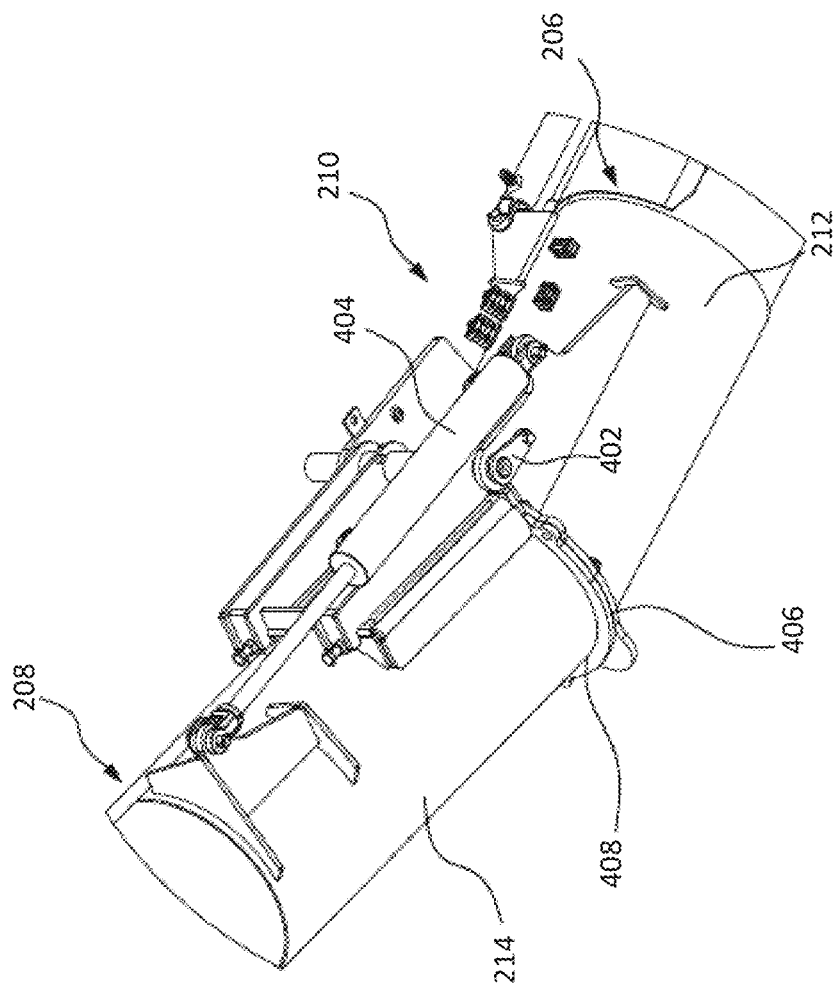
FIG. 4 is a detailed view of the joint assembly coupling the upper auger section to the lower auger section with auger assembly set in the operating position according to an exemplary embodiment.

In accordance with a non-limiting embodiment, the folding joint assembly 210 coupling the upper auger section 208 to the lower auger section 206 with an angular offset (see FIG. 1) is further illustrated in FIG. 4. As shown in FIG. 4, folding joint assembly 210 may include a hinge pin 402 having a folding axis. The hinge pin 402 is oriented to cause the upper auger section 208 to fold in the manner described. In other words, the hinge pin 402 defines the folding axis about which the upper auger section 208 may be folded. The hinge pin 402 may be oriented such that the upper auger section 208 and the lower auger section 206 can be rotated about one another in an operating state. Referring to FIG. 4, the folding joint assembly 210 comprises a hydraulic actuator 404 operatively connected to the upper auger section 208 and the lower auger section 206. The hydraulic actuator 404 is configured to expand and retract to move or pivot the upper auger section 208 between the transport and operating positions. As shown in FIG. 4, a flanged end 406 of the lower auger section 206 abuts a flanged end 408 of the upper auger section 208 when the auger assembly is set in the operating position. When the auger assembly 200 is set in the transport position, the folding joint assembly 210 is configured to move the upper auger section 208 about the folding axis defined by the hinge pin 402 such that the flanged ends 406, 408 of the upper and lower auger sections 206, 208 separate from each other.

Figure 3:
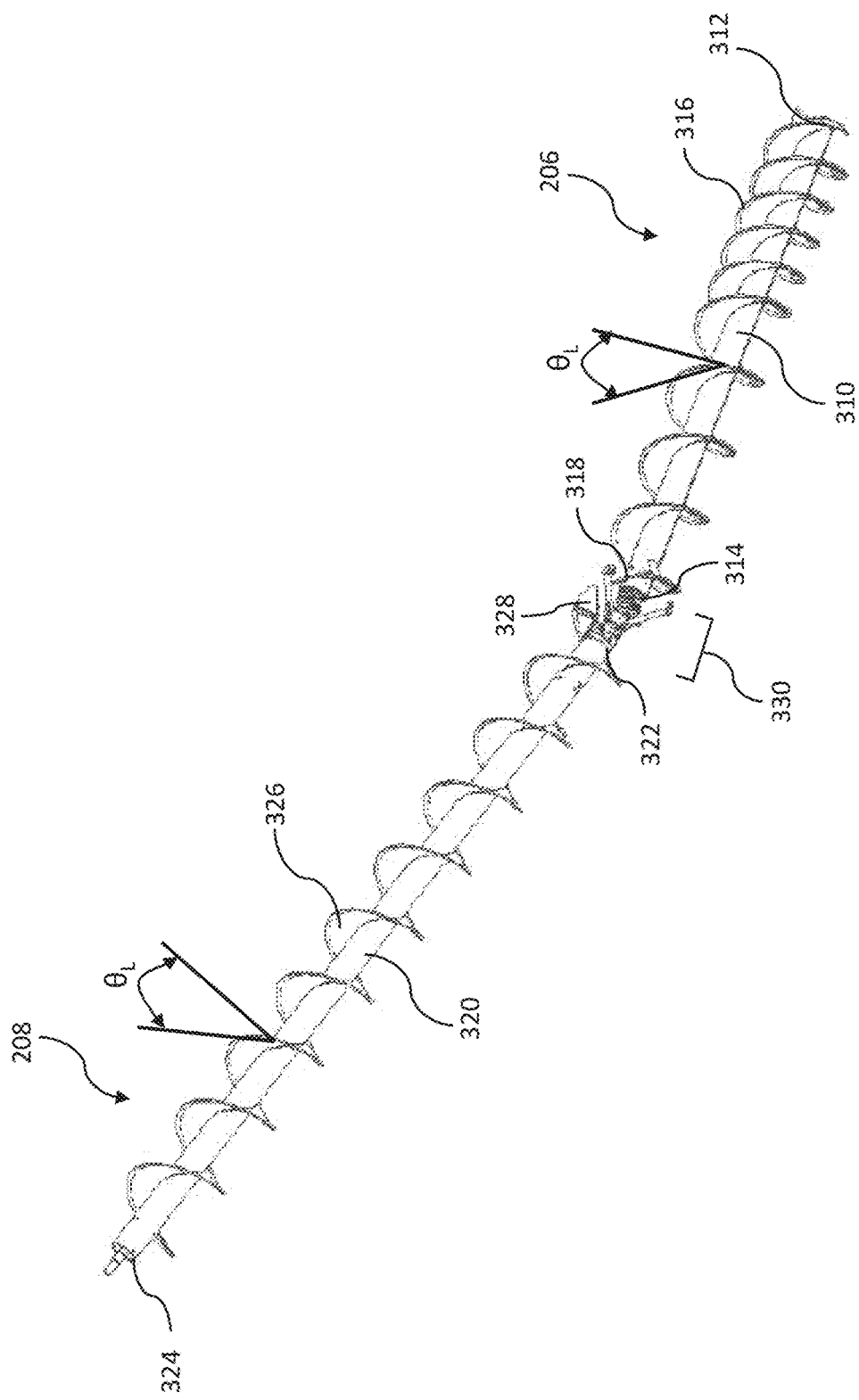
FIG. 3 is a side view of the auger assembly of the auger assembly with the tubular housing omitted from the figure according to an exemplary embodiment.

Referring to FIGS. 1-3, the lower auger section 206 comprises a tubular-shaped lower housing 212 and a lower auger shaft 310 disposed within the lower housing 212. In the illustrated embodiment, the lower auger shaft 310 includes a first end 312 disposed at the intake portion 202 of the auger assembly 200 and a second end 314 proximate to the folding joint assembly 210 of the auger assembly 200. The lower auger shaft 310 defines the longitudinal axis of the lower auger section 206 and is configured to rotate in a conveying direction about the longitudinal axis of the lower auger section 206. The lower auger section 206 further comprises a lower helical flight array 316 disposed along and projecting from the lower auger shaft 310 in a radial direction. As shown in FIG. 3, the lower helical flight array 316 extends from the first end 312 of the shaft 310 to the second end 314 of the shaft. The lower helical flight array 316 extends at a lift angle $\theta_L$ relative to a center cross-section of the lower auger shaft 310 and defines a helical path formed between an inner surface of the lower housing 212 and the lower auger shaft 310 such that agricultural material is conveyed along the helical path as the lower auger shaft 310 rotates in the lower housing 212.

Referring to FIGS. 1-3, the upper auger section 208 comprises a tubular-shaped upper housing 214 and an upper auger shaft 320 disposed within the upper housing 214. In the illustrated embodiment, the upper auger shaft 320 includes a first end 322 proximate to the folding joint assembly 210 of the auger assembly 200 and a second end 324 proximate to the discharge portion 204 of the auger assembly 200. The upper auger shaft 320 defines the longitudinal axis of the upper auger section 208 and is configured to rotate about the longitudinal axis of the upper auger section 208. The upper auger section 208 further comprises an upper helical flight array 326 disposed along and projecting from the upper auger shaft 320 in a radial direction. As shown in FIG. 3, the upper helical flight array 326 extends from the first end 322 of the shaft 320 to the second end 324 of the shaft 320. The upper helical flight array 326 extends at a lift angle $\theta_L$ relative to a center cross-section of the upper auger shaft 320 and defines a helical path formed between an inner surface of the upper housing 214 and the auger shaft 320 such that agricultural material is conveyed along the helical path as the upper auger shaft 320 rotates in the upper housing 214.

Figure 5:
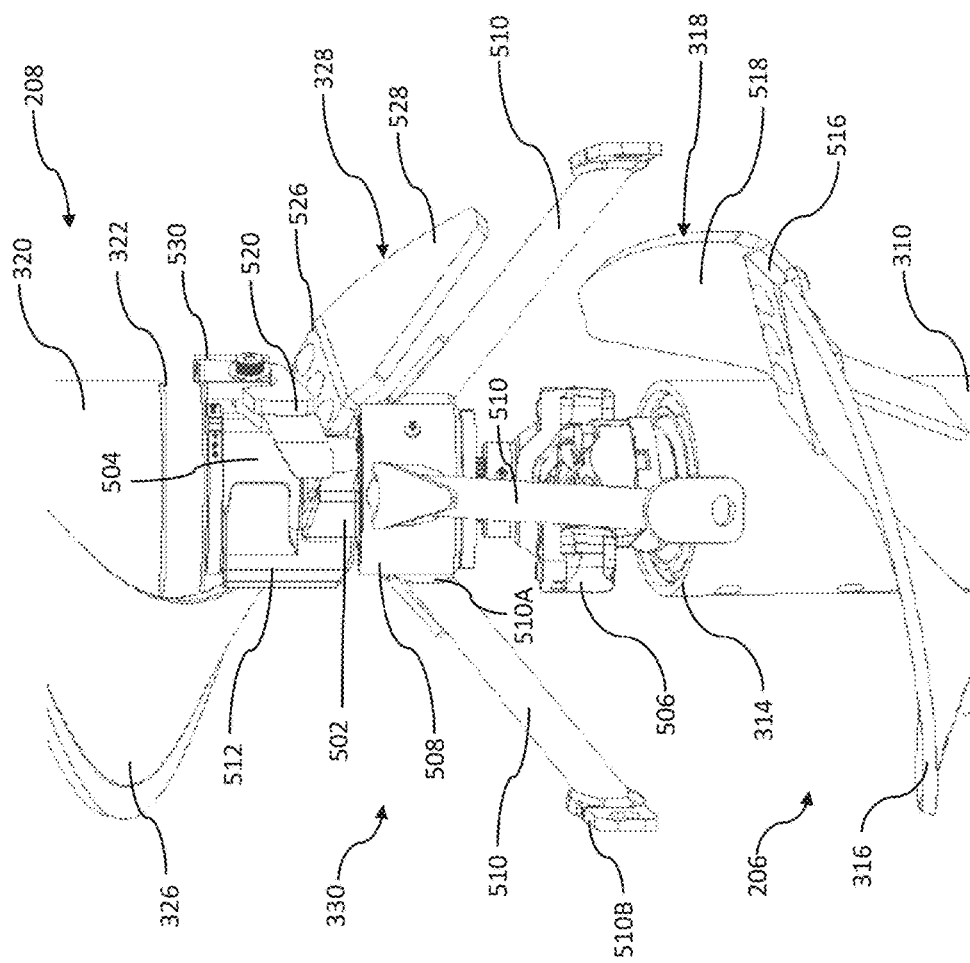
FIG. 5 is a detailed view of an auger coupling assembly coupling an end of the lower auger shaft to an end of the upper auger shaft with auger assembly set in the operating position according to an exemplary embodiment.

Referring to FIGS. 3 and 5, the auger assembly 200 comprises an upper flight extension 328 detachably mounted to a leading edge 526 of the upper helical fight array 326 and a lower flight extension 318 detachably mounted to a trailing edge 516 of the lower helical fight array 316. In other embodiments (not shown), the auger assembly 200 may comprise only an upper flight extension 328 that is detachably mounted to the leading edge of the upper helical flight array 326. In other embodiments (not shown), the auger assembly 200 may comprise only a lower flight extension 318 that is detachably mounted to the trailing edge of the lower helical flight array 316. As shown in FIG. 5, the lower flight extension 318 comprises a blade portion 518 extending toward the leading edge 526 of the upper helical flight array 326, and the upper flight extension 328 comprises a blade portion 528 extending toward the trailing edge 516 of the lower helical flight array 316.

As shown in FIGS. 3 and 5, the auger assembly 200 comprises an auger shaft coupling assembly 330 disposed between the second end 314 of the lower auger shaft 310 and the first end 322 of the upper auger shaft 320. The auger shaft coupling assembly 330 is configured to releasably connect the second end 314 of the lower auger shaft 310 to the first end 322 of the upper auger shaft 320 when the auger assembly 200 is set in the operating position. When the auger assembly 200 is set in the operating position and the second end 314 of the lower auger shaft 310 is operatively connected to the first end 322 of the upper auger shaft 320, the auger shaft coupling assembly 330 is configured to transmit torque applied from the lower auger shaft 310 to the upper auger shaft 320 such that the lower auger shaft 310 and the upper auger shaft 320 rotate in the conveying direction to convey agricultural material from the intake portion 202 to the discharge portion 204 of the auger assembly 200.

Referring to FIG. 5, the auger shaft coupling assembly 330 may comprise a lower auger coupling portion 502, an upper auger coupling portion 504, a joint 506, a bearing hanger 508, support legs 510, a drive pin 512, and a latch arm 520. In the illustrated embodiment, the lower auger coupling portion 502 is disposed at the end of the lower auger shaft 310 and is connected to the lower auger shaft 310 by the joint 506. The upper auger coupling portion 504 is disposed at the end of the upper auger shaft 320 and is configured to releasably connect to the lower auger coupling portion 502 when the when the auger assembly 200 is in the operating position. In the illustrated embodiment, the drive pin 512 is secured to the upper auger coupling portion 504 such that the drive pin 512 is disposed along an edge of the upper auger coupling portion 504 and the lower auger coupling portion 502 when the auger assembly 200 is set in the operating position.

Figure 9:
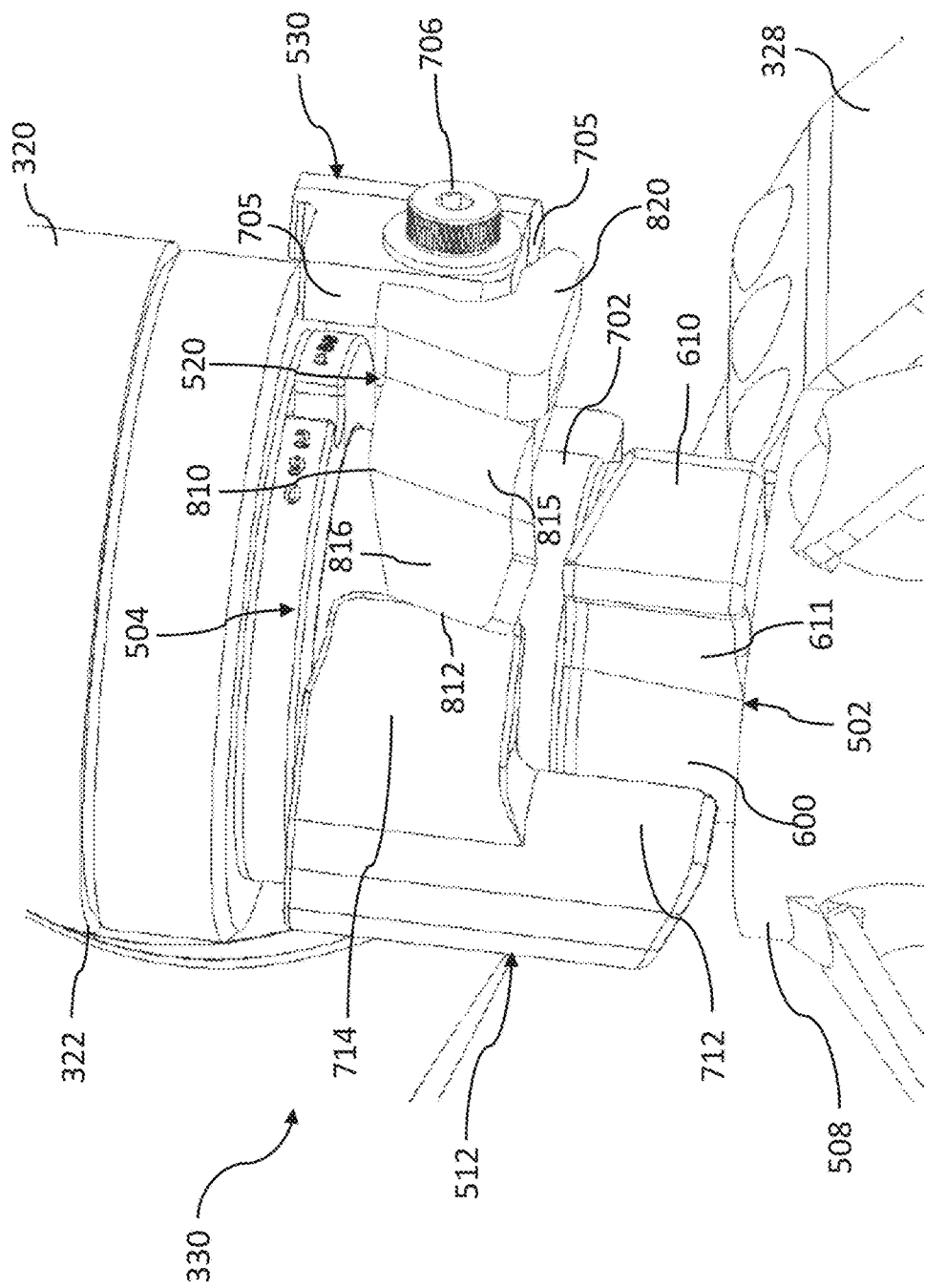
FIG. 9 is a detailed view of an auger coupling assembly coupling an end of the lower auger shaft to an end of the upper auger shaft with auger assembly set in the operating position and the latch arm is set in a disengaged position.
Figure 10:
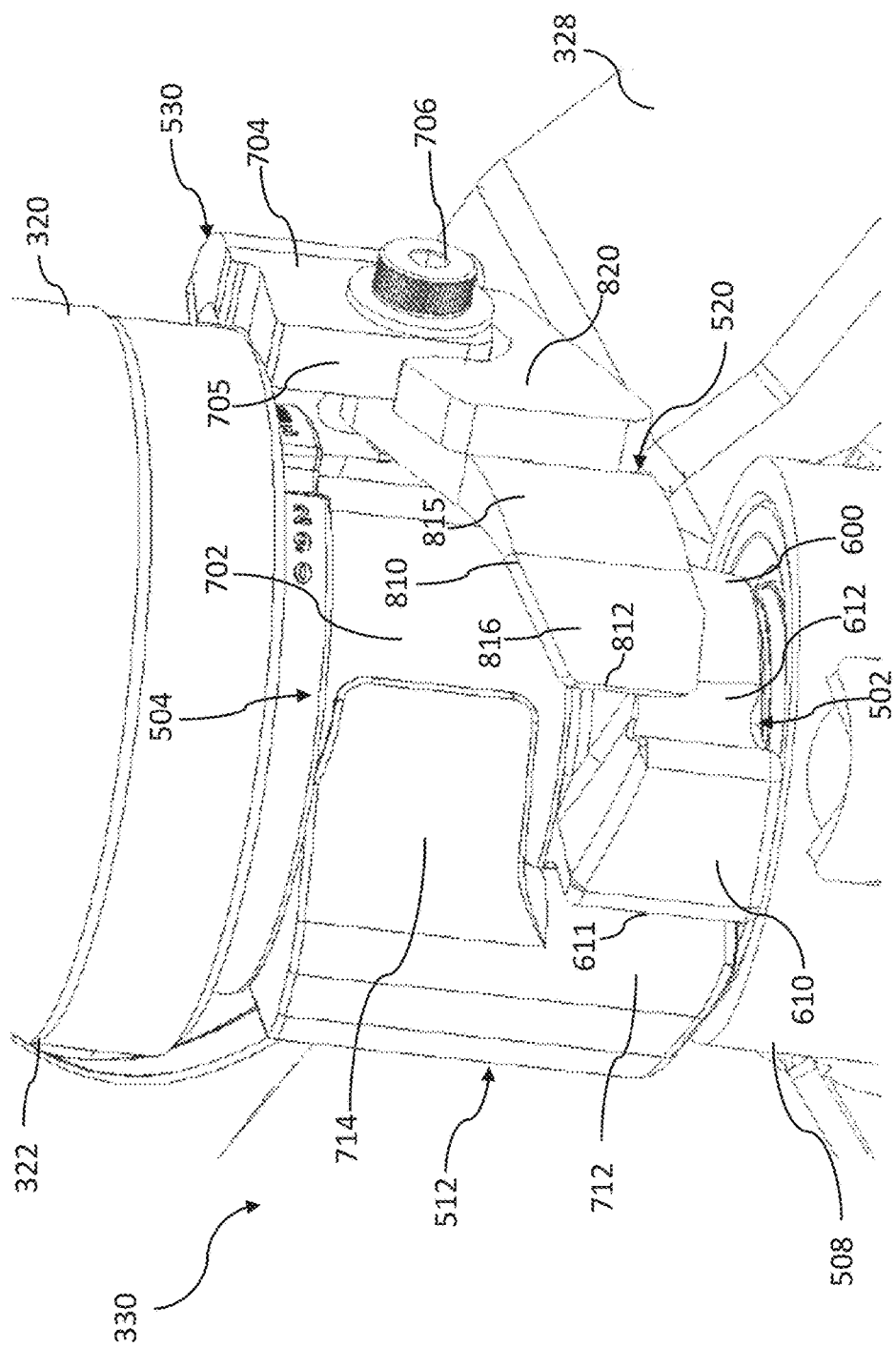
FIG. 10 is a detailed view of an auger coupling assembly coupling an end of the lower auger shaft to an end of the upper auger shaft with auger assembly set in the operating position and the latch arm is set in an engaged position.

As shown in FIG. 5, a handle 530 is coupled proximately to the first end 322 of the upper auger shaft 530 and overhangs by an edge of the upper auger coupling portion 504. The latch arm 520 is pivotably coupled to the handle 530 such that the latch arm 520 is configured to pivot in a direction substantially parallel to a longitudinal axis of the upper auger coupling portion 504 between an engaged position and a disengaged position. In one non-limiting embodiment, as shown in FIG. 9, the latch arm 520 extends entirely above a bottom end of the upper auger coupling portion 504 when set in the disengaged position. In one non-limiting embodiment, as shown in FIG. 10, the latch arm 520 is disposed at least partially below the bottom end of the upper auger coupling portion 504 when set in the engaged position As shown in FIG. 5, the bearing hanger 508 circumscribes a lower end of the lower auger coupling portion 502. Each support leg 510 comprises a proximal end 510A connected to the bearing hanger 508 and a distal end 510B connected to the housing 212 of the lower auger section 206 such that the bearing hanger 508 and the support legs 510 hold the lower auger shaft 310 and the lower auger coupling portion 502 in a desired orientation relative to housing 212. In the illustrated embodiment, the bearing hanger 508 and support legs 510 hold the lower auger coupling portion 502 and the lower auger shaft 310 at angular offset position relative to the upper auger coupling portion 504 and the upper auger shaft 320 when the auger assembly 200 is set at the operating position. In other embodiments (not shown), the auger coupling assembly 330 may include a bearing hanger and support legs disposed at the both the end of the lower auger shaft 310 and the end of the upper auger shaft 320 to provide further support for the upper and lower auger shafts 310, 320.

In some embodiments, the joint 506 comprises a drive configured to transmit rotation forces from the lower auger shaft 310 to the upper auger shaft 320. According to some embodiments of the present disclosure, the joint 506 connecting the lower auger coupling portion 502 to lower auger shaft 310 is a universal joint (also known as a universal coupling, a U-joint, a Cardan joint, a Hardy-Spicer joint, or a Hooke's joint). However, any joint that allows the transfer of rotational motion through an angle would be acceptable.

Figure 6:
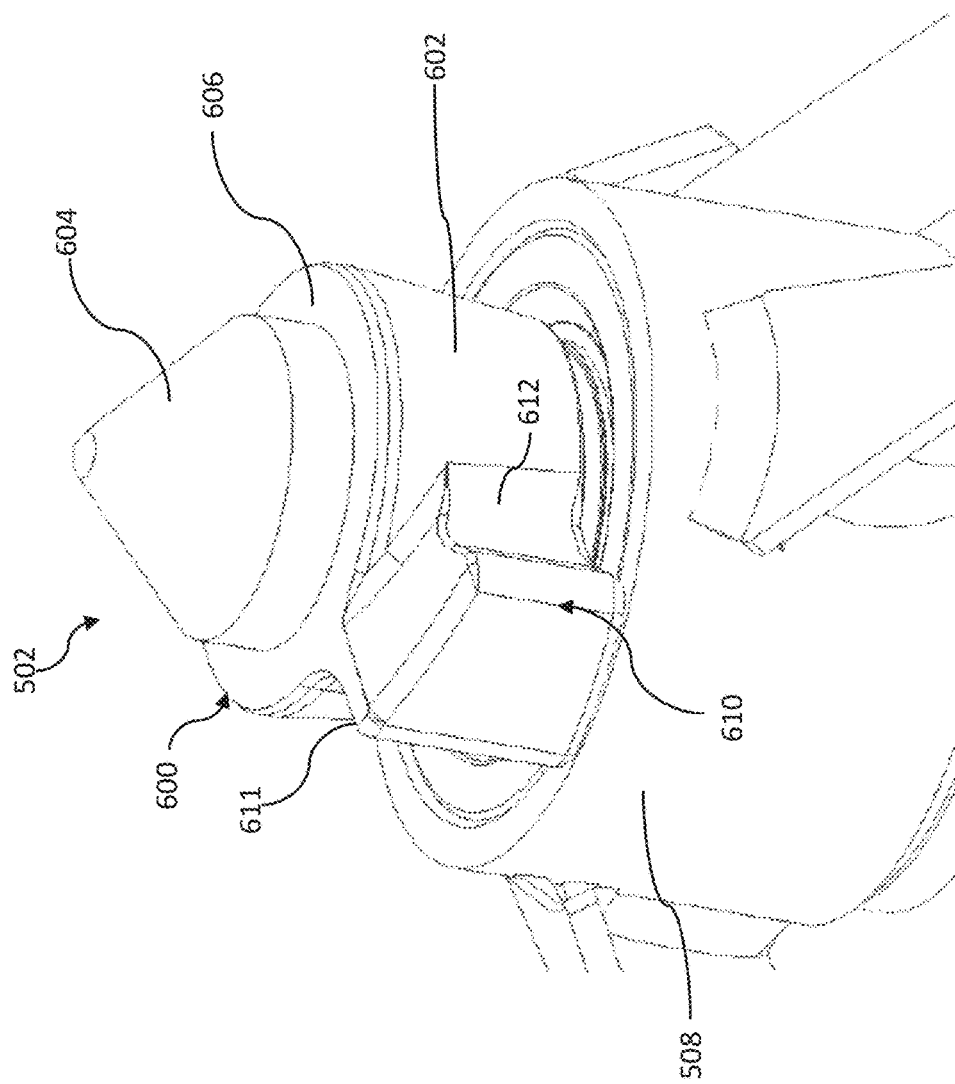
FIG. 6 is a perspective view of a lower auger coupling portion according to an exemplary embodiment.

In some embodiments, as shown in FIG. 6, the lower auger coupling portion 502 comprises a cylindrical-shaped drive hub 600 projecting out of the bearing hanger 508 and a lobe 610 projecting from a side surface 602 of the drive hub 600. The drive hub 600 is rotatably driven by the joint 506 such that the drive hub 600 is configured to rotate in the conveying direction about the longitudinal axis of the upper auger shaft 320 when the auger assembly is set in the operating position. In some embodiments, the drive hub 600 comprises a shoulder 606 and a conical-shaped head section 604 projecting from the shoulder 606 such that a step-shaped edge is formed along the transition between the shoulder 606 and the head section 604. The head section 604 of the drive hub 600 is configured to be inserted into the upper auger coupling portion 504 when the lower auger coupling portion 502 is operatively connected to the upper auger coupling portion 504. The shoulder 606 of the drive hub 600 is configured to engage the upper auger coupling portion 504 when the lower auger coupling portion 502 is operatively connected to the upper auger coupling portion 504.

As shown in FIG. 6, the lobe 610 projects from the side surface 602 of the drive hub 600. The lobe 610 comprises a front face 611 extending transverse to the side surface 602 of the drive hub 600 and a back end 612 having a concave surface that transitions smoothly from the side surface 602 of the drive hub 600. The lobe 610 defines a solid member extending from the front face 611 to the back end 612. The front face 611 of the lobe 610 is configured to rotatably engage the drive pin 512 in the conveying direction as the drive hub 600 is driven by the joint 506 such that rotation force is transmitted from the lower auger coupling portion 502 to the upper auger coupling portion 504.

Figure 7A:
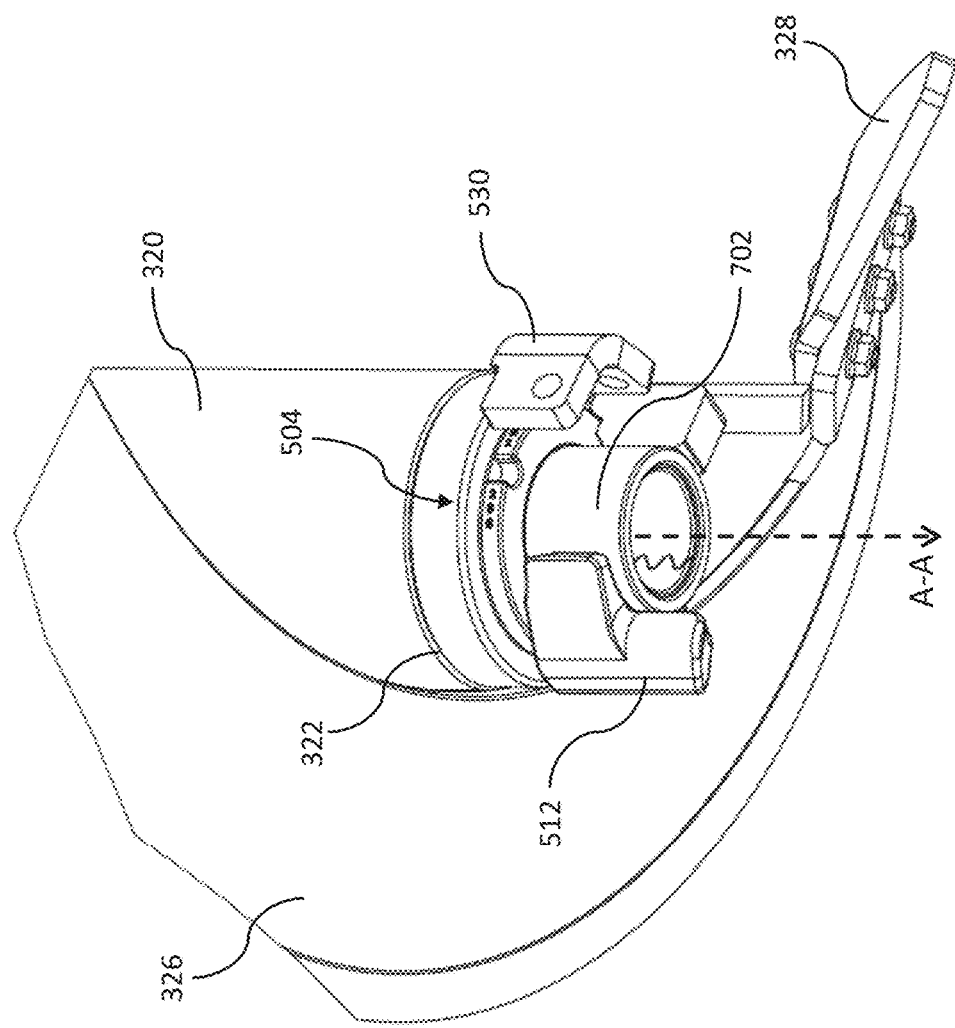
FIGS. 7A and 7B are perspective and detail views, respectively, of an upper auger coupling portion according to an exemplary embodiment.
Figure 7B:
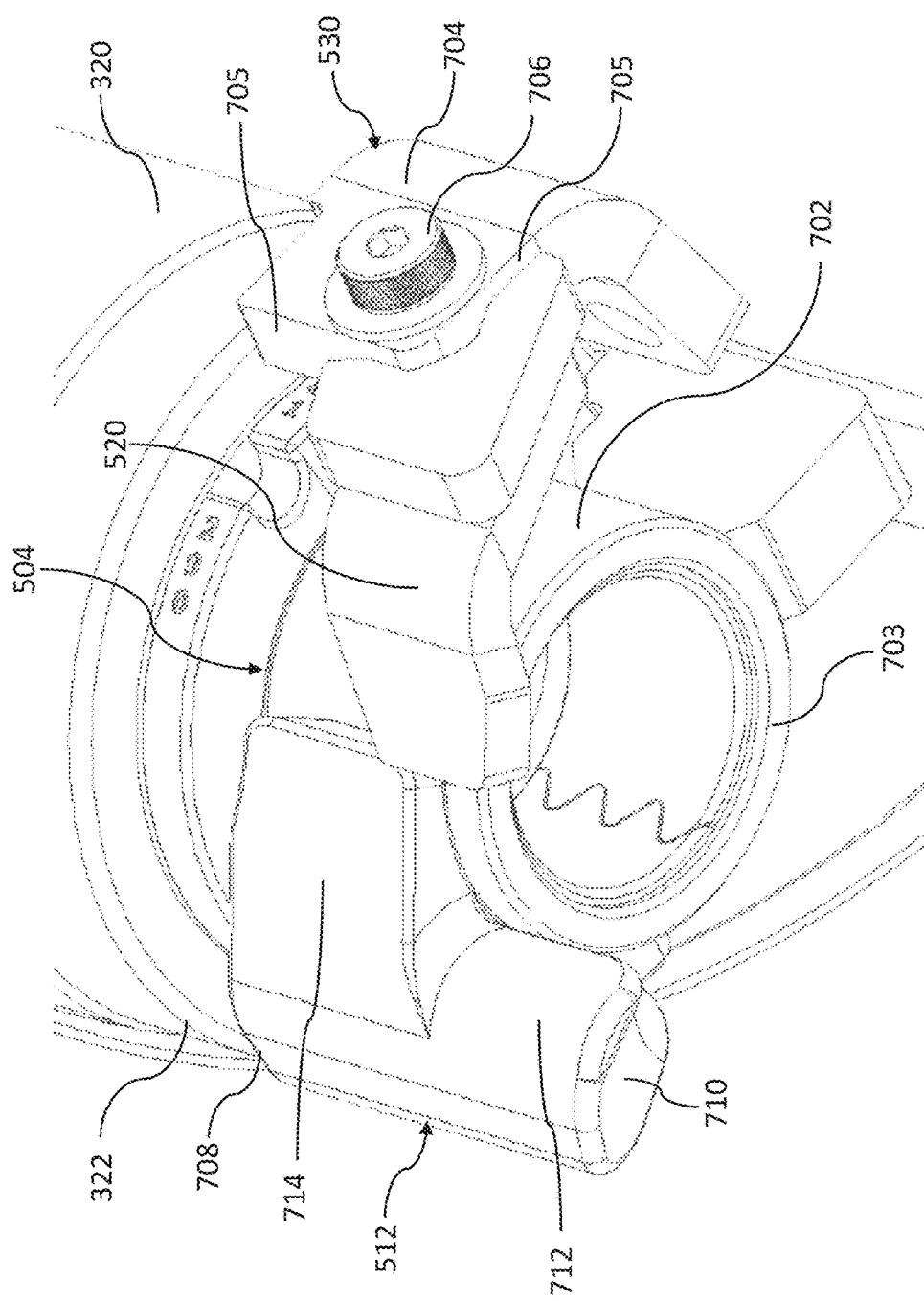

Referring to FIGS. 7A and 7B, in some embodiments, the upper auger coupling portion comprises a sleeve 702 that extends along the longitudinal axis A-A of the upper auger shaft 320 and terminates at an end face 703. The sleeve 702 is configured to receive the head section 604 of the drive hub 600 such that the drive hub 600 is rotatably engaged with the sleeve 702. When the auger assembly 200 is set in the operating position, the head section 604 of the drive hub 600 is received in the sleeve 702, and the end face 703 of the sleeve 702 engages the shoulder 606 of the drive hub 600.

As shown in FIG. 7B, the drive pin 512 is secured along a side of the sleeve 702 and comprises a first end 708 disposed proximate to the first end 322 of the upper auger shaft 320. In some embodiments, the drive pin 512 terminates at a second end 710 disposed below the end face 703 of the sleeve 702. The drive pin 512 comprises a cam surface 712 disposed proximate to the second end 710 and projecting beyond the end face 703 of the sleeve 702. The cam surface 712 is configured to engage the front face 611 of the lobe 610 of the drive hub 600. The drive pin 512 further includes a flange 714 projecting from a side of the drive pin 512 disposed proximately to the first end 708. The profile of the flange 714 corresponds to the shape of the sleeve 702 such that the flange 714 partially wraps around the sleeve 702.

Referring to FIG. 7B, the handle 530 is secured proximately to the first end 322 of the upper auger shaft 320 and comprises a bent section 704 disposed proximately to the sleeve 702 of the upper auger coupling portion 504. The handle 530 comprises a pair of planar-shaped stop faces 705 disposed along the edge of the bent section 704, whereby one of the stop faces 705 extends perpendicularly to the other one of the stop faces 705. As shown in FIG. 7B, the latch arm 520 is pivotably secured to the bent section 704 of the handle 530, whereby the stop faces 705 of the handle 530 restrict the pivoting movement of the latch arm 520. The bent section 704 includes a mounting hole configured to receive a fastener 706 such that the latch arm 520 is detachably mounted to the handle 530. In some embodiments, the fastener 706 may include a screw, bolt, or rivet, which extends through the mounting hole to secure the latch arm 520 to the handle 530.

FIGS. 8A-G illustrate various views of the latch arm 520 according to some embodiments of the present disclosure. As shown in FIGS. 8A, 8B, 8F, and 8G, the latch arm 520 comprises a body 810 having a mounting section 814 disposed proximately at a first end 811, a guard section 816 disposed proximately at a second end 812, and an elbow section 815 providing a curved transition between the mounting section 814 and the guard section 816. The body 810 is bent such that the guard section 816 extends obliquely with respect to the mounting section 814 such that the profile of the body 810 corresponds to the contour of the upper and lower auger coupling sections 502, 504.

Figure 8A:
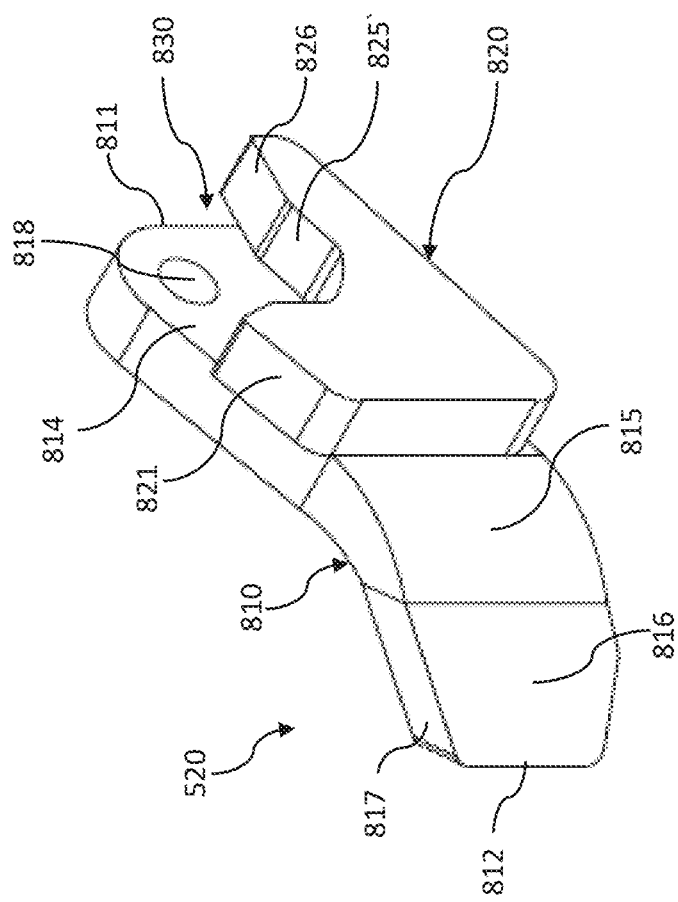
FIGS. 8A-G illustrate various views of a latch arm according to an exemplary embodiment.
Figure 8B:
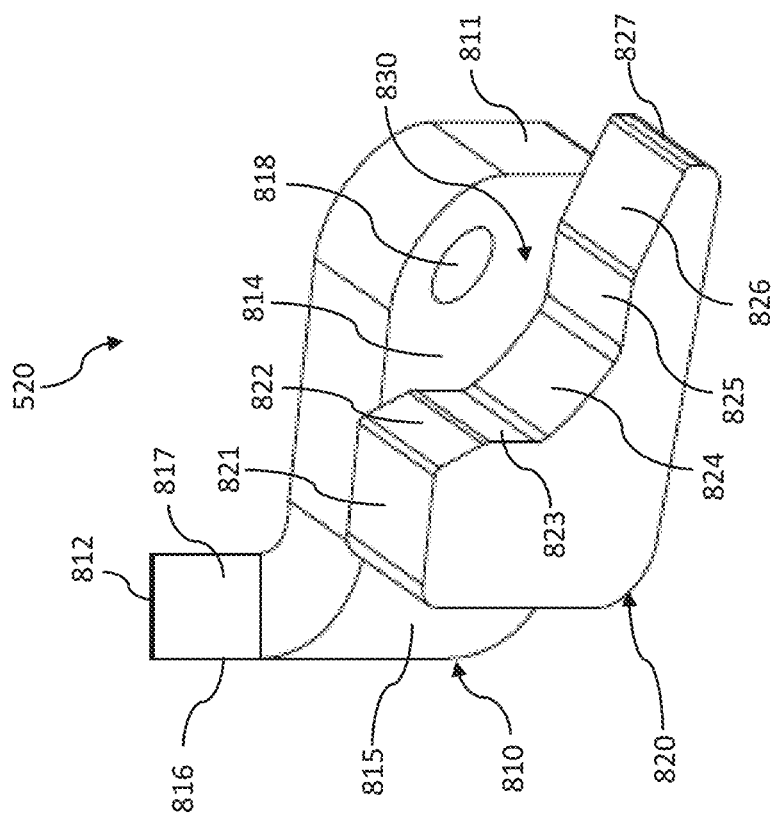
Figure 8C:
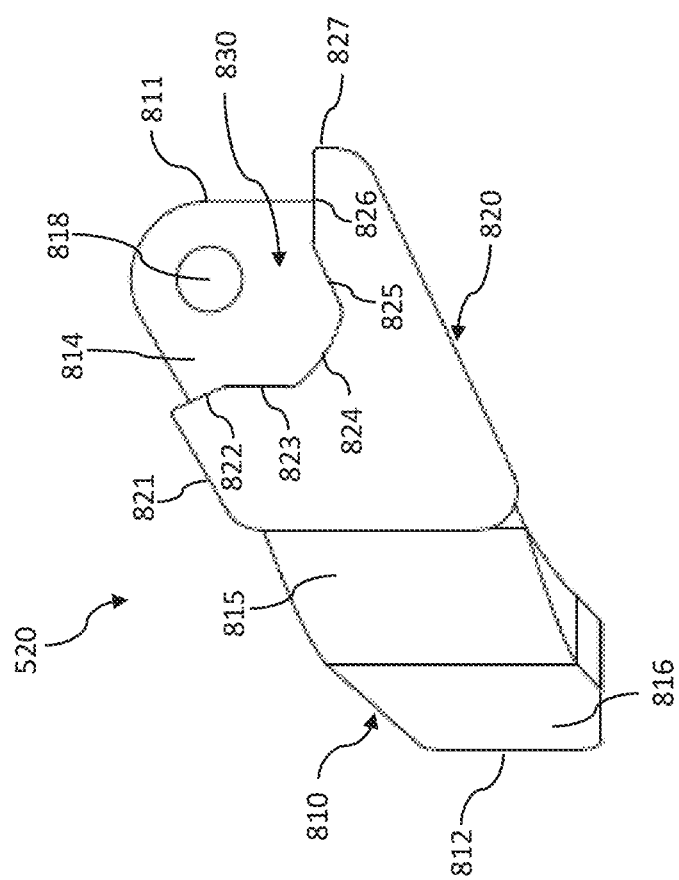
Figure 8D:
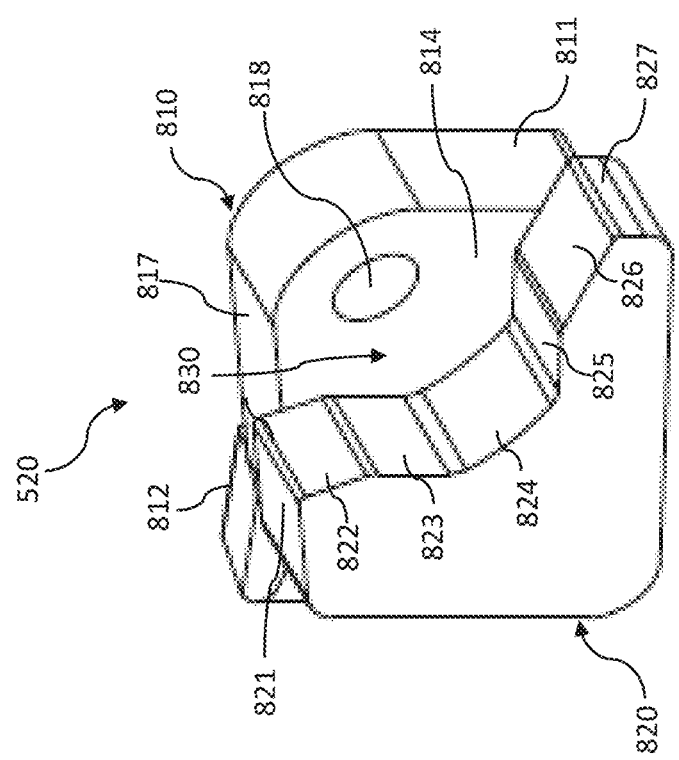
Figure 8E:
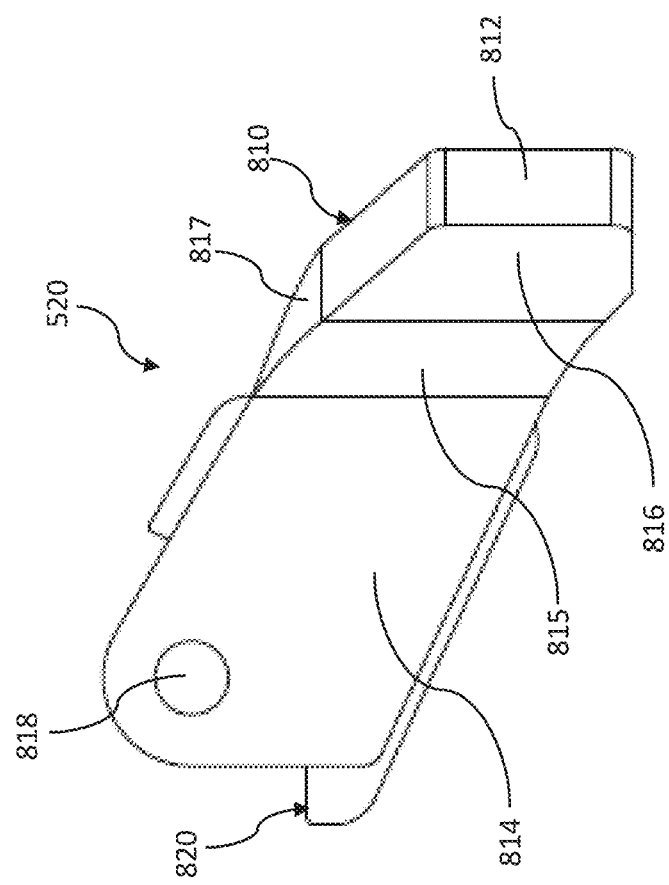
Figure 8F:
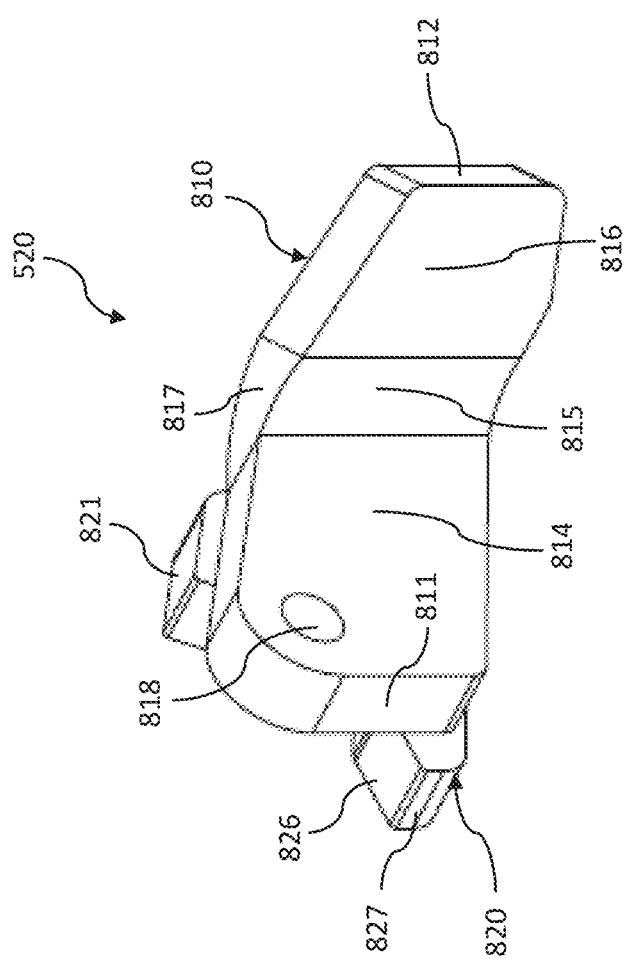
Figure 8G:
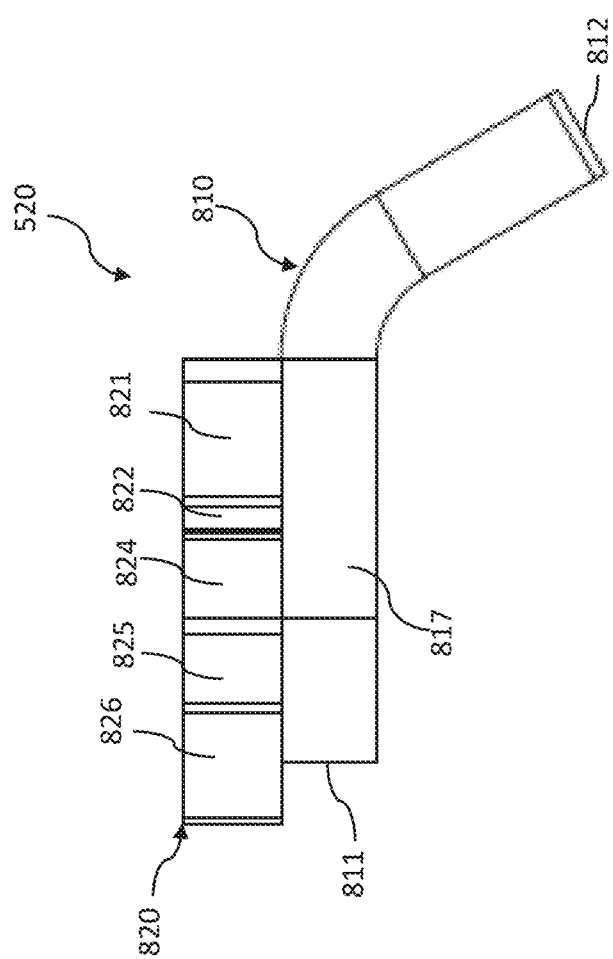

As shown in FIGS. 8A, 8B, and 8D, the latch arm 520 comprises a grip member 820 projecting along the mounting section 814 of the body 810. Referring to FIGS. 8B and 8C, the grip member 820 comprises a top surface 821 protruding above an upper surface 817 of the body 810 and a jagged edge defining a plurality of cam surfaces 822-826 that extend from the top surface 821 to a tip 827 of the grip member 820. A notch 830 is formed along the surface of the mounting section 814 of the body 810 and is constrained by the cam surfaces 822-826 of the grip member 820. A pin hole 818 extends through the mounting section 814 of the body 810 and is open to the notch 830.

Referring to FIGS. 8A-D, 9, and 10, an exterior side of the mounting section 814 of the body 810 is configured to rest against the bent section 704 of the handle 530 such that at least a part of the bent section 704 of the handle 530 is received in the notch 830. The pin hole 818 is configured to coincide with the mounting hole of the handle 530 such that the fastener 706 extends through both the mounting hole of the handle 530 and the pin hole 818 of the body 810, thereby pivotably securing the latch arm 520 to the handle 530. The fastener 706 defines a pivot axis for the latch arm 520, whereby the pivot axis extends through the sleeve 702 of the upper auger coupling portion 502. The grip member 820 is configured to grasp the bent section 704 of the handle 530 such that one or more of the cam surfaces 822-826 engage the stop faces 705 of the handle 530 as the latch arm 520 pivots between the engaged and disengaged positions. When pivoting between the engaged and disengaged positions, the guard section 816 with the second end 812 of the body 810 is configured to pivot in a direction substantially parallel to the longitudinal axis A-A of the sleeve 702.

Figure 11:
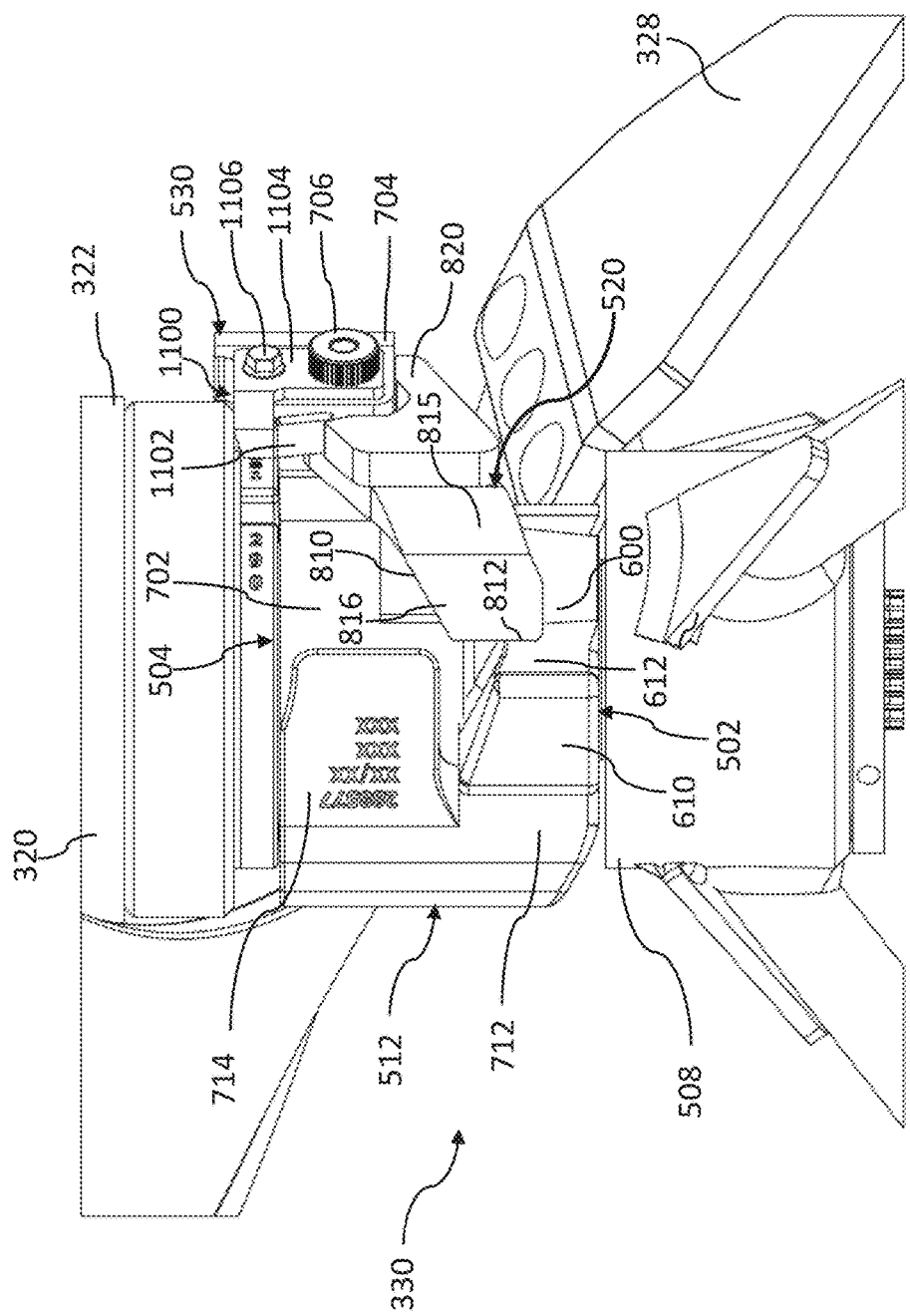
FIG. 11 is a detailed view of an auger assembly coupling an end of the lower auger shaft to an end of the upper auger shaft with auger assembly set in the operating position and the latch arm biased in the engaged position by a spring element.

In operation, the auger coupling assembly 330 is configured to transmit torque applied from the lower auger shaft 310 to the upper auger shaft 320 by releasably connecting the lower auger coupling portion 502 to the upper auger coupling portion 504. Referring to FIGS. 7B and 11, the latch arm 520 is biased toward the engaged position, by for example, gravity or a spring, such that the guard section 816 of the body 810 is disposed at least partially below the end face 703 of the sleeve 702. In one non-limiting embodiment, as shown in FIG. 11, the auger coupling assembly 330 includes a spring element 1100 configured to bias the latch arm 520 in the engaged position. In the illustrated embodiment, the spring element 1100 comprises a leaf spring 1102 having a first end pressed against the cam surfaces of the grip member 820 of the latch arm 520. In some embodiments, as shown in FIG. 11, the spring element 1100 further includes a mounting plate 1104 extending from a second end of the leaf spring 1102 and secured to the bent section 704 of the handle 530 by a fastener 1106 (e.g., screw). Accordingly, when the head section 604 of the drive hub 600 is initially inserted into the sleeve 702 of the upper auger coupling portion 504, the latch arm 520 is set in the engaged position.

If the lobe 610 is substantially displaced from rotatably engaging the drive pin 512 such that the guard section 816 of the body 810 is at least partially interposed between the lobe 610 and the drive pin 512, the lobe 610 is configured to rotationally engage the body 810 in the conveying direction. In some instances, when the lobe 610 rotatably engages the body 810 in the conveying direction, the front face 611 of the lobe 610 engages the body 810 of the latch arm 520. The rotational engagement by the lobe 610 overcomes the bias force acting on the latch arm 520, thereby causing the body 810 of the latch arm 520 to pivot toward the disengaged position in a direction substantially parallel to the longitudinal axis A-A of the sleeve 702, whereby the guard section 816 of the body 810 is disposed above the end face 703 of the sleeve 702 (FIG. 9). Accordingly, the guard section 816 of the latch arm 520 is disposed above the lobe 610 so that the lobe 610 is free to rotate in the conveying direction toward the drive pin 512. In some non-limiting embodiments, the latch arm 520 is biased by a spring such that the latch arm 520 is configured to deaccelerate the rotation of the lobe 610 when the lobe 610 rotatably engages the latch arm 520 in the conveying direction. By deaccelerating in rotation, the lobe 610 engages the drive pin 512 with less impact after the guard section 816 of the latch arm 520 clears by the lobe 610.

Referring to FIG. 10, the lobe 610 rotatably engages the drive pin 512 in the conveying direction such that rotation forces are transmitted from the lower auger shaft 310 to the upper auger shaft 320. The lobe 610 is positioned for rotational engagement with the drive pin 512 in the conveying direction when the front face 611 of the lobe 610 engages the cam surface 712 of the drive pin 512. Once the lobe 610 is positioned for rotational engagement with the drive pin 512, the bias force acting on the latch arm 520 causes the latch arm 520 to pivot back toward the engaged position.

In some instances, as both the lower auger shaft 310 and the upper auger shaft 320 are rotating in the conveying direction, the drive pin 512 becomes rotationally displaced from the lobe 610, whereby the front face 611 of the lobe 610 is separated from the cam surface 712 of the drive pin 512 by a gap. In some instances, the rotational displacement between the drive pin 512 and the lobe 610 may be caused by a speed differential between the rotating upper and lower auger shafts 310, 320, such that the upper auger coupling portion 504 rotates at a faster speed than the lower auger coupling portion 502. If the lobe 610 starts to become rotationally displaced from the drive pin 512, the guard section 816 of the body 810 is configured to rotably engage the lobe 610 in the conveying direction, whereby the second end 812 of the body 810 engages the back end 612 of the lobe 610. By rotatably engaging the lobe 610 in the conveying direction, the guard section 816 of the body 810 prevents the lobe 610 from separating even further from the drive pin 512. Accordingly, the latch arm is configured to maintain the lobe 610 adjacent the drive pin 512 or within a predetermined degree of separation from the drive pin 512.

In some embodiments, the predetermined degree of separation between the drive pin 512 and the lobe 610 is configured by setting a predetermined gap formed between the second end 812 of the body 810 of the latch arm 520 and the back end 612 of the drive lobe 610 when the lobe 610 is positioned for rotational engagement with the drive pin 512. In some embodiments, the predetermined degree of separation corresponds to the circumferential distance along the side surface 602 of the drive hub 600. In some non-limiting embodiments, the predetermined degree of separation may range from 0° to 20°. Accordingly, if the lobe 610 starts to become displaced from rotatably engaging the drive pin 512 in the conveying direction, the lobe 610 will separate from the cam surface 712 of the drive pin 512 by a small amount of rotation (e.g., 10°, 20°) before contacting the second end 812 of the body 810 of the latch arm 520. The predetermined degree of separation may be adjusted accordingly as a tolerance for design purposes.

By maintaining the lobe 610 adjacent the drive pin 512 or within a predetermined degree of separation from the drive pin 512, the latch arm 520 reduces the force and momentum of the impact between the lobe 610 and the drive pin 512 when the lobe 610 re-engages the drive pin 512 in the conveying direction. As a result, the latch arm 520 reduces the likelihood of wear or damage on the components of the auger coupling assembly 330, ultimately prolonging the operability of the auger assembly 200 and the farm implement.

While the subject matter of this disclosure has been described and shown in considerable detail with reference to certain illustrative embodiments, including various combinations and sub-combinations of features, those skilled in the art will readily appreciate other embodiments and variations and modifications thereof as encompassed within the scope of the present disclosure. Moreover, the descriptions of such embodiments, combinations, and sub-combinations is not intended to convey that the claimed subject matter requires features or combinations of features other than those expressly recited in the claims. Accordingly, the scope of this disclosure is intended to include all modifications and variations encompassed within the spirit and scope of the following appended claims.

The invention claimed is:

1. An auger assembly for a farm implement, the auger assembly comprising:
   a first auger section comprising a first auger shaft configured to rotate in a conveying direction about a longitudinal axis of the first auger section;
   a second auger section comprising a second auger shaft configured to rotate about a longitudinal axis of the second auger section;
   a first auger coupling portion coupled to an end of the first auger shaft, the first auger coupling portion comprising a drive hub and a lobe projecting from a side surface of the drive hub;
   a second auger coupling portion coupled to an end of the second auger shaft, the second auger coupling portion comprising a sleeve configured to receive the drive hub such that the drive hub is rotatably engaged with the sleeve;
   a drive pin secured to the second auger coupling portion; and
   a latch arm configured to pivot in a direction substantially parallel to the longitudinal axis of the second auger section between an engaged position and a disengaged position;
   wherein the lobe is configured to rotationally engage the drive pin in the conveying direction when the drive hub is received in the sleeve, such that rotation forces are transmitted from the first auger shaft to the second auger shaft; and
   wherein the latch arm is configured to rotatably engage the lobe in the conveying direction when the latch arm is in the engaged position, such that the latch arm maintains the lobe adjacent the drive pin or within a predetermined degree of separation from the drive pin.

2. The auger assembly of claim 1, wherein the lobe is configured to rotationally engage the latch arm in the conveying direction when the drive hub is received in the sleeve and the lobe is displaced from rotatably engaging the drive pin in the conveying direction, thereby causing the latch arm to pivot toward the disengaged position such that the lobe rotates toward the drive pin in the conveying direction.

3. The auger assembly of claim 2, wherein the latch arm is configured to pivot back to the engaged position when the lobe is positioned for rotational engagement with the drive pin, thereby maintaining the lobe adjacent the drive pin or within a predetermined degree of separation from the drive pin.

4. The auger assembly of claim 1, wherein the latch arm is configured to pivot about a pivot axis extending through the sleeve.

5. The auger assembly of claim 1, wherein the latch arm comprises a first end pivotably secured to the second auger coupling portion and a second end configured to move in a direction substantially parallel to the longitudinal axis of the second auger section.

6. The auger assembly of claim 1, wherein the drive pin comprises a cam surface projecting beyond an end face of the sleeve, and the lobe is configured to rotatably engage the cam surface of the drive pin in the conveying direction when the drive hub is received in the sleeve.

7. The auger assembly of claim 1, wherein the drive hub comprises a shoulder configured to engage an end face of the sleeve when the drive hub is received in the sleeve.

8. The auger assembly of claim 1, wherein the latch arm is biased toward the engaged position.

9. The auger assembly of claim 1, wherein the predetermined degree of separation is less than about 20 degrees from the drive pin.

10. The auger assembly of claim 1, wherein the predetermined degree of separation is less than about 10 degrees from the drive pin.

11. A farm implement comprising:
    a frame;
    a container mounted on said frame and configured to hold agricultural material; and
    an auger assembly configured to convey agricultural material held in the container, wherein the auger assembly comprises:
    a first auger section comprising a first auger shaft configured to rotate in a conveying direction about a longitudinal axis of the first auger section and a first helical flight array disposed along and projected from the first auger shaft;
    a second auger section comprising a second auger shaft configured to rotate about a longitudinal axis of the second auger section and a second helical flight array disposed along and projected from the second auger shaft;
    a folding joint assembly coupled to the first and second auger sections and comprising a folding axis, the folding joint assembly is configured to rotate the second auger section about the folding axis between a transport position and an operating position; and
    an auger shaft coupling assembly configured to releasably connect an end of the first auger shaft to an end of the second auger shaft when the second auger section is in the operating position, wherein the auger shaft coupling assembly comprises:
    a first auger coupling portion coupled to the end of the first auger shaft;
    a second auger coupling portion coupled to the end of the second auger shaft, the first auger coupling portion comprising a lobe,
    a drive pin secured to the second auger coupling portion; and
    a latch arm configured to pivot in a direction substantially parallel to the longitudinal axis of the second auger section between an engaged position and a disengaged position;

wherein the second auger coupling portion is configured to at least partially receive the first auger coupling portion;

wherein the lobe is configured to rotationally engage the drive pin in the conveying direction when the first auger coupling portion is at least partially received in the second auger coupling portion, such that rotation forces are transmitted from the first auger shaft to the second auger shaft; and wherein the latch arm is configured to rotationally engage the lobe in the conveying direction when the latch arm is in the engaged position, such that the latch arm maintains the lobe adjacent the drive pin or within a predetermined degree of separation from the drive pin.

12. The farm implement of claim 11, wherein the first auger coupling portion comprises a drive hub and the lobe projects from a side surface of the drive hub; and wherein the second auger coupling portion comprises a sleeve configured to receive the drive hub such that the drive hub is rotatably engaged with the sleeve.

13. The farm implement of claim 12, wherein the lobe of the first auger coupling portion is configured to rotationally engage the drive pin in the conveying direction when the drive hub of the first auger coupling portion is received in the sleeve of the second auger coupling portion.

\* \* \* \* \*